Figure 1:
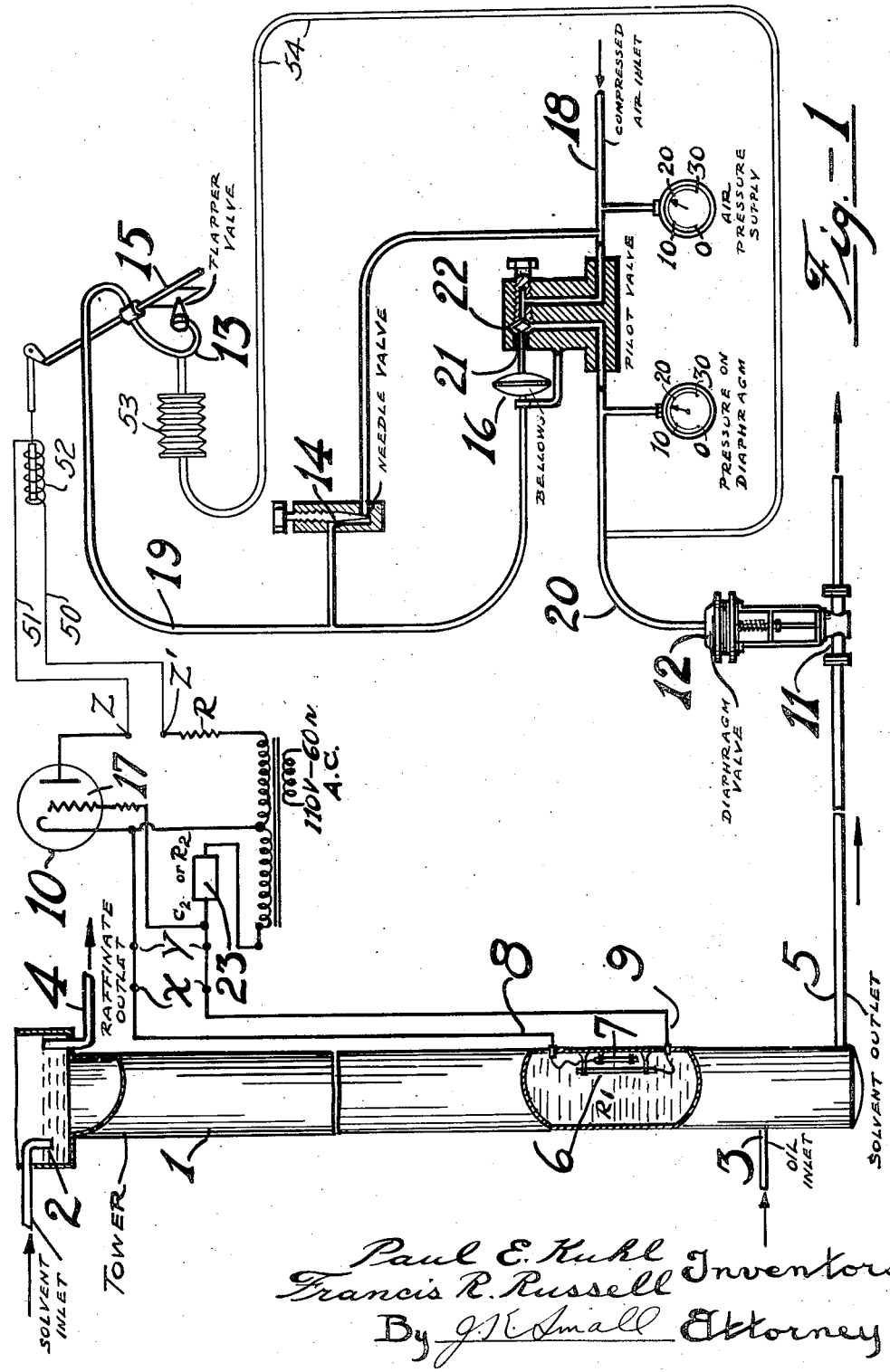

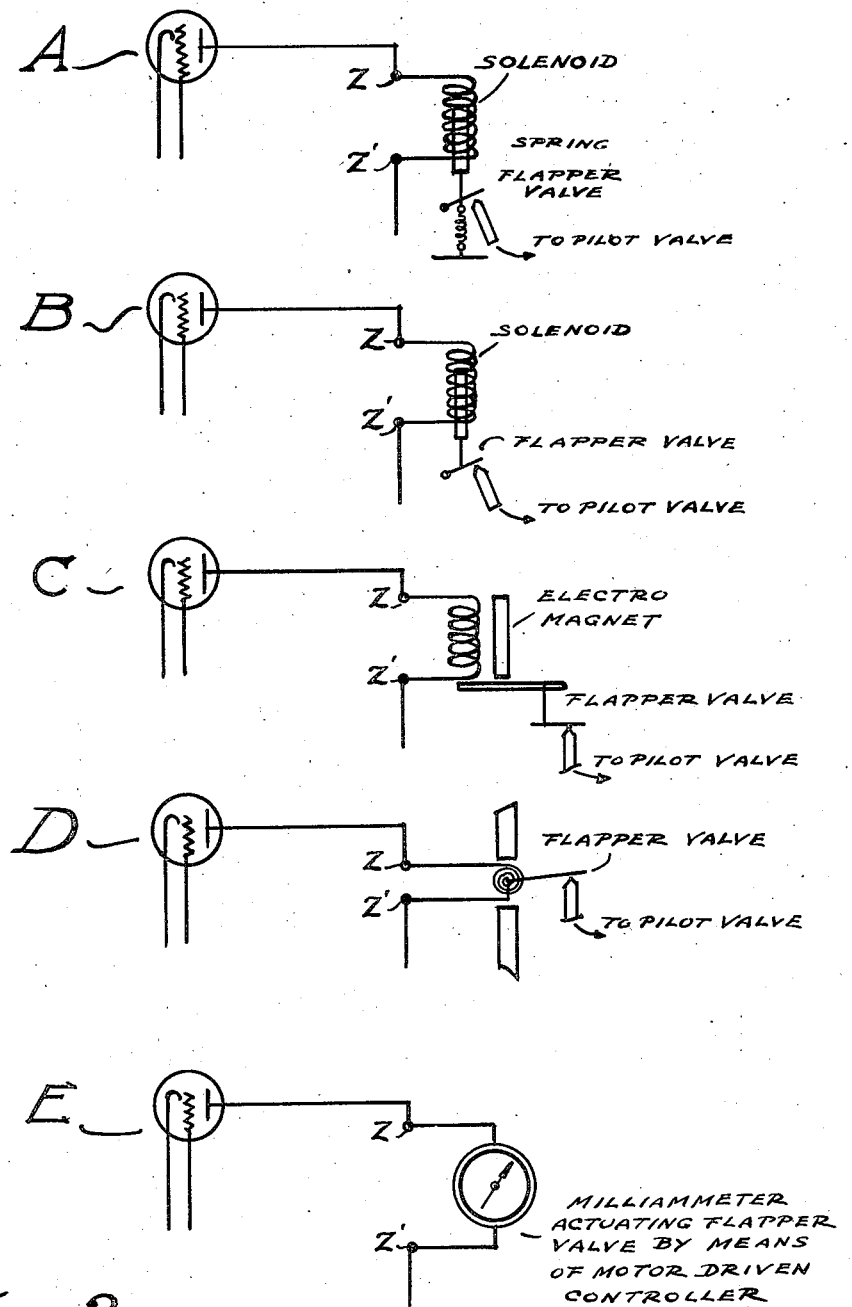

Patented Feb. 9, 1943

2,310,298

UNITED STATES PATENT OFFICE 2,310,298

LIQUID LEVEL CONTROL DEVICE

Paul E. Kuhl, Madison, and Francis R. Russell, Elizabeth, N. J., assignors to Standard Oil Development Company, a corporation of Delaware Application July 28, 1938, Serial No. 221,862

3 Claims. (Cl. 137—68)

This invention relates to a device for controlling the level of the interface between two fluids of different electrical resistivities and is more particularly concerned with a device which is actuated by the difference in the electrical resistivities of the two fluids. The invention especially relates to a device by which it is possible to maintain the interface level at any pre-determined point over a relatively wide range by means of plate or strip electrodes which actuate a rate of flow control valve adapted to respond to the variations in an electrical circuit. A specific embodiment of the invention is maintaining the interface level at a pre-determined point in the treatment of hydrocarbon oils with selective solvents.

In the selective solvent treatment of hydrocarbon oils, the oil may be mixed with the solvent and the two layers allowed to separate in a separating chamber or the oil and solvent may be flowed in countercurrent relationship through a tower. When the selective solvent used has a specific gravity greater than that of the material treated, it will be introduced into the top of a countercurrent tower and the oil at the bottom. On the other hand, when the selective solvent has a specific gravity lower than that of the oil to be treated, it will be introduced into the bottom of the tower and the oil at the top. In these operations it is important to maintain the level of the interface between the two phases at a pre-determined point for any particular operation. Also in order to increase the flexibility of the equipment and in order to secure optimum operating conditions for various feed stocks and modes of operation, it is desirable to change the interface level over a relatively wide range.

Various methods which depend upon the differences in the electrical resistivities of the two phases have been proposed heretofore, but it has been found that these methods do not give a smooth throttling action on the control valve and do not permit the adjustment of the interface level. We have now found a method which makes use of the difference in the electrical resistivities of the two phases and overcomes the above mentioned disadvantages. The process of our invention maintains the interface level of a pre-determined point by means of plate or strip electrodes connected with an electrical circuit which actuates a rate of flow control valve adapted to respond to the variations in the electrical circuit.

The nature of our invention and the method of its operation will be fully understood from the following description read with reference to the accompanying drawings which is a semi-diagrammatic view in sectional elevation of various types of apparatus suitable for the purpose.

For purposes of illustration, it is assumed that the feed oil is a petroleum oil and that the solvent is phenol. Numeral 1 designates a countercurrent treating tower in which the phenol is introduced by means of the line 2. The phenol flows downwardly through tower 1 contacting upflowing petroleum oil which is introduced into tower 1 by means of oil inlet 3. The raffinate phase is removed from tower 1 by means of line 4 and the solvent extract is removed from tower 1 by means of line 5. The interface level is maintained in the lower part of tower 1 and is automatically controlled in the following manner. Electrodes 6 and 7 are vertically disposed over the range through which it is desired to permit the interface level to vary. These electrodes are rigidly attached to the inside walls of the tower and are suitably insulated from the tower. In the drawings two electrodes are shown, but it will be understood that the wall of the tower itself, if the tower is made of metal, may act as one of the contacts. Electrodes 6 and 7 are connected by wires 8 and 9 to the grid circuit of thyratron tube 10. In the drawings the thyratron tube illustrated is a grid controlled gas filled rectifying tube. The amount of extract withdrawn from tower 1 by means of line 5 is determined by valve 11 actuated by diaphragm motor 12 which in turn responds to variations in the grid circuit as described below.

When the resistance between the two vertically disposed wires or plates 6, 7 decreases as would be caused by a rise in the phenol layer above the control point and if the grid circuit contains a condenser $C_2$ 23, then this decrease in resistance will so change the phase of the grid voltage with respect to the plate voltage of tube 10 as to permit more current to flow in the plate circuit of the tube. This increased current will operate the flapper valve in such a way as to cause the compressed air valve or so-called diaphragm motor 12 to open more and permit more phenol extract to flow from the tower. Conversely, if the phenol level should drop, the resistance between the vertical wires and plates 7 would increase, thereby causing the phase of the grid voltage to shift in the opposite direction from the plate voltage and result in a decrease in the plate current which in turn would change the flapper valve 15 position in the opposite direction, tending to close the compressed air valve 11 and thereby decrease the amount of phenol allowed to flow from the tower.

The variable electric current obtained in this manner should preferably be fed to a mechanism capable of variable or throttling action in such a way that the ultimate control valve 11 can be positioned correctly to hold the extract level constant when feed rates to the tower are constant. Three such mechanisms are shown in A, D and E of Figure 2. Leads 50 and 51 connected to electrical magnet 52 diagrammatically illustrate in Figure 1 an operative structure by which the flapper valve 15 may be controlled.

When the resistance $R_2$ is substituted for the condenser $C_2$ in the grid circuit of the thyratron tube, a variable output can no longer be obtained from the tube. Instead an off-on action will be obtained when the resistance $R_1$ of the extract at the contacts 6 and 7 reaches a certain critical value. In this case contact points could be substituted for the vertical electrodes 6 and 7 shown in Figure 1 and mechanisms B and C in Figure 2 would be adequate. If desired, a direct current potential may be used in the grid circuit of the thyratron tube in place of the alternate current potential shown, provided $C_2$ is replaced by $R_2$.

The electrical circuit shown for the thyratron tube in Figure 1 assumes a tube with critical grid potentials negative to the cathode which is the type usually employed for control installations in which little power is available in the grid circuit. It is to be understood that tubes with positive grid control potentials may be adapted for this service, in which case the uppermost part of the connections marked Y in Figure 1 would be shifted from the cathode side of the anode transformer windings to the anode side of the winding. The control valve may be placed on the solvent inlet line to the tower instead of the outlet and the system may also be adapted to regulate control valves on any feed or outlet lines.

In the case of commercial applications in which the tower is of sufficient cross section to permit the positioning of vertical plates of considerable area within the tower, the same may be placed relatively close to each other and the voltage adjusted accordingly. For example, if plates having at least 10 square centimeters in area are utilized, they may be separated by approximately 2 millimeters and a sufficient voltage applied to cause sufficient current to flow when the plates are partially surrounded with the phenol phase to operate sensitive milliammeters or movements such as shown in drawings C, D or E in Figure 2 without the use of a thyratron tube. In other words, the phenol phase is caused to conduct enough current to operate the flapper valve control shown in C and D or the motor driven controller shown by drawing E. The connections designated X in Figure 1 instead of connecting to Y in Figure 1 would connect directly to the electromagnet of C or the milliammeter movement of D or E in Figure 2 in series with the battery or other potential supply. The currents obtained will probably not be of sufficient magnitude to operate solenoids as shown in A and B of Figure 2 unless relatively large closely spaced plates or many plates alternately spaced as in a condenser are used. These parallel plates should extend vertically if it is desired to vary the position of the flapper valve inasmuch as a variable current will be obtained only when the plates are disposed vertically. If the plates are disposed horizontally, the current will tend to jump from zero or essentially zero to its maximum value, causing the flapper valve to either close or open to its widest extent. The variable action (so-called throttling action) with the vertical plates would generally be a more desirable action. In the event that safety rules prohibit the use of plates and their attendant appreciable current, then the vertical plates or vertical wires controlling the thyratron tube would be the only solution.

The variations of plate current from the thyratron are adapted by various means to regulate the flapper valve 13 on a rate of flow control device. A suitable rate of flow control is described in Foxboro Bulletin 177-1, pages 6 and 7 and in the Foxboro Bulletin 175, pages 13, 14 and 15 published in 1932 by the Foxboro Company of Roxboro, Massachusetts. As applied to the present invention, the regulation of the flapper valve 13 in response to the variations in the grid circuit is as follows. Compressed air is fed through a fine needle valve 14 to a small flapper valve 13 discharging into the air. Over the nozzle end of this flapper valve 13 is a hinged flapper 15, the position of which can be adjusted by the elements sensitive to the variations in the electric current. The position of this flapper valve 15 determines the back pressure of the air passing out of the nozzle 13. This back pressure transmitted through line 19 operates a bellows 16 mechanically connected to a small pilot valve 22. The pilot valve serves two functions. It controls the inlet from the compressed air supply fed through line 18 and line 20 to the diaphragm valve 12 and it controls the vent to the air from the diaphragm motor or diaphragm valve vented through opening 21. In its extreme position it can completely or almost completely shut off the supply of compressed air to the diaphragm motor and permit easy venting of the air in the diaphragm motor. In the other extreme position it can shut off or almost shut off the vent from the diaphragm motor and open the valve supplying compressed air to its full extent. In this manner small changes in the position of the flapper on the flapper valve by controlling pressure in the bellows operating the pilot valve will in turn control the amount of compressed air supplied to the diaphragm motor and the amount in turn which is vented to the air, thereby controlling the pressure in the diaphragm motor.

The operation may be varied by inserting a bellows arrangement 53 in the line between the pilot valve and the diaphragm valve or diaphragm motor. This bellows serves to move the flexible nozzle of the flapper valve in such a manner that the system re-adjusts itself whenever the flapper adjustment is varied so as to make the amount of change proportional to the rate of change of the variable in eliminating "hunting."

Any suitable method may be employed to vary the position of flapper valve 15 in response to the variations in electric current from the thyratron. Five suitable mechanisms are designated in Figure 2 as A, B, C, D and E. In each case the mechanism is to be so connected to the control system and to the compressed air valve that an increase in the electric current will operate the flapper valve and will cause the air valve 11 in the extract outlet to allow increased flow from the tower.

In the type designated by A an increase in electric current will cause an increased pull in the solenoid and cause the flapper to move farther from the nozzle until the increase in spring tension just balances the increase in pull of the solenoid. In type B no spring is used so that the flapper valve is either fully open or fully closed. This method will not produce a smooth throttling action, although the pressure supplied to the diaphragm motor or valve can be prevented from fluctuating too rapidly by including a hold-up space of relatively large volume, compared to the throughput of nozzle 13 or vent 21, in line 19 or 20 respectively. Type C is similar to B except that an electro-magnet is substituted for the solenoid. Spring loading the armature of the electro-magnet to attempt to duplicate the throttling action of type A is inadvisable inasmuch as the pull of the magnet core on the armature increases too greatly as the armature approaches the core.

In the type designated by D, the anode current of tube 10, or the output current from plates of large area, is connected to a spring balanced coil in a magnetic field similar to the movement of a direct current milliammeter. The flapper of the flapper valve may be attached to the coil in place of the needle on the usual milliammeter. In the type designated by E, the anode current of tube 10 is connected to a milliammeter movement which actuates the flapper valve by means of a motor-driven controller such as described by Leeds and Northrup of Pennsylvania in their catalog N—OOB published in 1938. In both types D and E, it is desired to obtain a variable anode current from tube 10. In the case of a grid controlled gas filled rectifying tube, this variable current can be obtained by throwing the grid voltage out of phase with the anode voltage by placing a capacity $C_2$ or an inductance in series with the contact resistances $R_1$ in the grid circuit.

When using the gas filled grid controlled rectifying tube, the anode (plate) current should always be limited to the safe value for the particular tube type used by means of the resistance of the anode circuit. In the event that the solenoids, milliammeters, etc., in series with the anode do not have sufficient resistance to limit the current to the safe value, additional resistance such as R in the diagram should be included in the anode circuit.

If a solvent of lower specific gravity than oil is used, it would be understood that the raffinate phase will be withdrawn from the bottom of the tower and the extract phase from the top of the tower. In this situation, due to the fact that the raffinate phase will have higher electrical resistivity than the extract phase, the resistances $R_1$ and $R_2$ (or resistance $R_1$ and capacity $C_2$) as shown in the drawing will be reversed. It will be understood that $R_2$ may be of variable resistance (or $C_2$ of variable capacity) so that it may be adjusted to the requirements of the particular extract or raffinate phase existing in the tower. Adjustment of the resistance $R_2$ is, however, very seldom necessary because the electrical resistivity of the extract phase will in almost all cases be considerably less than the resistivity of the oil phase or raffinate.

In processes for the solvent treating of hydrocarbons utilizing phenol, the electrical resistivities of both phases will ordinarily be in excess of 50,000 ohms per centimeter. When treating with phenol the electrical resistivities of the raffinate and extract phases respectively will be about 20,000,000 and higher for the raffinate and from 50,000 to 12,000,000 for the extract phase, varying, of course, with the temperature used, the particular stock being treated and the ratio of solvent to oil. However, in general, it may be stated that the resistivity of the raffinate in a phenol extraction system under equilibrium condition seems to be about from 2 to 400 times as high as that of the resistivity of the extract. It will be understood, of course, that the resistivities will depend to a large extent upon the particular oil being treated, the source from which it is obtained, and the temperature at which the treatment is carried out and also upon the solvent being used.

The process of the present invention may be widely varied and the apparatus adjusted to meet the particular operating conditions. In general, it is preferred to have plate electrodes which extend vertically from 2" to 24", preferably plate electrodes which extend vertically at least 12". The area of electrodes will, of course, depend upon the resistivities of the respective phases as well as upon the distance at which the electrodes are spaced. For example, if the electrodes are two millimeters apart, the area of the respective electrodes should be not less than ten square centimeters. In general, the electrodes should have an area of from ten to 200 square centimeters. However, if a thyratron tube is used, vertically extended wires may be substituted for the plate electrodes. It is within the scope of the present invention to provide electrodes of sufficient surface in which it would be possible to dispose with the thyratron tube.

The device of the present invention also may be used to control the interface level in a batch treating operation. The present invention, however, is particularly adapted to a continuous countercurrent tower as shown in the drawings. The device may be used in each stage of a multistage treating operation or in any type of process in which it is necessary or desirable to maintain the interface between two phases at a particular point and to secure smooth operation without surging.

The term "fluids" or "phases" as used here is meant to include both liquids and vapors (gases). Hence, the apparatus could be used to control the interface between any conducting liquid and a gas or vapor above it as well as the interface between two immiscible liquids.

This invention is not to be limited by any theories as to mode of operation nor by any details which have been given merely for purposes of illustration, but is to be limited only by the following claims in which it is desired to claim all novelty insofar as the prior art permits.

We claim:

1. Apparatus for maintaining in a countercurrent treating system the level of the interface between two substantially immiscible liquid having dissimilar electrical resistivities, comprising vertically disposed electrical plate contacts closely spaced to each other, means for applying an electrical potential to said contacts so that a change in the interface level will cause a variation in the continuous current between the contacts, means for transmitting this variation to the anode current of a gas-filled grid-controlled rectifying tube, means associated with said rectifying tube for controlling the opening or closing movement of a valve in response to variations in the intensity of the continuous current flowing between said contacts whereby to regulate the relative volumes of the two liquids in the system.

2. Apparatus for maintaining the level of the interface between two substantially immiscible liquids in solvent treating equipment, said liquids having dissimilar electrical resistivities comprising electrical contacts of at least ten square centimeters in area spaced closely and parallel to each other, means for applying an electrical potential to said contacts so that a change in the interface level will cause a variation in the continuous current between the contacts, means for transmitting this variation to the anode current of a gas-filled grid-controlled rectifying tube, means associated with said rectifying tube for actuating a compressed air control valve under conditions in which the opening or closing movement of said valve is a function of the intensity of the continuous current flowing between said contacts and under conditions in which said valve regulates the relative volumes of the two liquids in the system in response to the variations of the current between the parallel electrical contacts.

3. Apparatus in accordance with claim 2 in which said electrical contacts are vertically disposed.

PAUL E. KUHL.
FRANCIS R. RUSSELL.